Patented May 23, 1939

2,159,241

UNITED STATES PATENT OFFICE 2,159,241

DISABLING-GAS-PRODUCING CHEMICALS

Duncan B. Williams, Glen Ridge, N. J., assignor, by mesne assignments, to Union Carbide and Carbon Corporation, a corporation of New York No Drawing. Application February 28, 1935, Serial No. 8,580

8 Claims. (Cl. 167—47)

This invention relates to disabling-gas-producing chemicals, and more especially to chemicals of the type commonly known as tear gas, and to methods of producing and distributing such disabling gases.

The disabling properties of chloracetophenone vapors are well known. U. S. Patent No. 1,750,101 discloses the use of chloracetophenone and other normally solid irritant-gas-producing substances in solution in normally liquid disabling-gas-producing substances. Similarly, the disabling properties of crotonaldehyde vapors are old in the art. U. S. Patent No. 1,378,488 discloses the use of crotonaldehyde and other normally liquid disabling-gas-producing substances as solvents for normally solid disabling-gas-producing substances. However, all of these substances or solutions have suffered in a greater or less degree from one or more disadvantages, such as excessive cost, insufficient effectiveness, low persistency, dangerous permanent toxic effect, low volatility, difficulty of manipulation, fire hazard, instability, etc. Hence none of them have been entirely satisfactory.

Chloracetophenone has been widely used by police departments as a tear gas. Since it is normally a crystalline solid, a fuse or other heat source is necessary to sublimate it. However, in certain applications, chloracetophenone has been used dissolved in alcohol, and a fuse is then unnecessary. Both of these applications entail objectionable fire and explosion hazards, the first from the lighted fuse, and the second from the inflammable alcohol vapors.

A suitable disabling-gas-producing chemical for use in controlling mobs and apprehending criminals should have certain properties. The vapors should effectively decapacitate a person subjected thereto; that is, the vapors even in low concentrations should produce a relatively prolonged and strong disabling effect. However, there should be no dangerous toxic effect other than temporary disability. The vapors should be non-inflammable at least within the range of effective concentrations so that fire and explosion hazards are minimized. The chemical should be stable even when standing for long periods of time so that there is no appreciable decomposition or decrease in strength. It should be highly volatile so that it vaporizes readily and rapidly and should preferably have high surface-wetting properties so that it quickly spreads over any surface with which it comes in contact and vaporizes the more readily. Also, the chemical should be in such a form, preferably a mobile liquid, that it can be easily manipulated and applied, for example, by atomizing it through a nozzle or other spray device. Of course, the material should be as cheap as possible to make it practicable from an economic standpoint.

It is the primary object of my invention to provide novel disabling-gas-producing chemicals having all of the above-enumerated desirable properties to a substantial degree. Another object of my invention is to provide novel methods of producing and distributing my novel disabling-gas-producing chemicals.

In accordance with this invention, novel disabling-gas-producing chemicals are prepared by dissolving the halogenated acetophenones, such as chloracetophenone, bromacetophenone, iodoacetophenone, and chlorbromacetophenone, in crotonaldehyde. These solutions are chemically stable, volatile, mobile liquids which vaporize readily, and the vapors produce, even in low concentrations, an irritating and strongly disabling lachrymatory effect. The vapors also cause irritation of the nose and throat and are mild vesicants so that even the skin is irritated. Hence anyone exposed to these vapors is immediately completely incapacitated. However, these effects, though severe, are merely temporary and there is no permanent toxic effect on human beings.

I have found that chloracetophenone is soluble in both anhydrous and water-saturated crotonaldehyde to the extent of about 67% by weight at 25° C. The solution is an ideal disabling-gas-producing chemical, having all of the hereinbefore-discussed desirable properties. The lachrymatory and total disabling effect is greater than either constituent alone, and tests indicate that the effect is considerably greater than that of the simple combined effects of the two constituents alone, although there is no apparent chemical interaction between the constituents.

For the best results, the solution preferably comprises 10% chloracetophenone and 90% crotonaldehyde by weight. This solution is amber in color and has a specific gravity of 0.895 at 20/20° C. and a density of 7.45 pounds per gallon at 20° C. There is a volume shrinkage in the solution of approximately 9.4%; that is, the volume of the solution is about 9.4% less than the sum of the volumes of the separate constituents. The solution is a mobile liquid having a high vapor pressure and good surface-wetting properties so that it volatilizes readily and rapidly. Concentrations as low as 0.1% by weight in air are absolutely unbearable. The lower limit of inflammability of the vapors is about 3% and the upper limit about 15% by weight, so that the limits of inflammability are well above the range of effective concentrations.

In certain applications, it is desirable that the irritating gas or vapor be visibly apparent. This is advantageous, for instance, in indicating the course and extent of distribution of the irritating gas, in screening the distributor of the gas, and in producing a demoralizing psychological effect on the victims. To accomplish this, my novel disabling-gas-producing chemicals may be used in conjunction with suitable smoke- or visible-fume-producing chemicals, such, for example, as a tetrahalide of the elements of group 4 of the periodic table. Silicon tetrachloride, titanium tetrachloride, and tin tetrachloride are especially desirable. The disabling-gas producer and the smoke producer are preferably simultaneously liberated at substantially the same point from separate containers.

My novel disabling-gas-producing chemicals may be distributed or projected by a number of methods. The solution may be confined in a container or bomb and hurled by hand or otherwise to the point of application where it is liberated in any well-known manner as by a fuse or the breaking of frangible containers. A device such as is disclosed in my Patent No. 2,008,235, issued July 16, 1935, is especially suitable. Also, the solution may be confined in a container under pressure and liberated through a nozzle in the form of a spray. This is preferable since it promotes rapid distribution and vaporization. If the irritant gas is used in conjunction with a smoke-producing agent, the bomb may comprise two containers for separately confining the two substances, or the two substances may be separately contained under pressure and simultaneously liberated through spray nozzles at substantially the same point.

The following example will serve to illustrate one application of my novel disabling-gas-producing chemicals. Approximately one quart of a solution containing 10% chloracetophenone and 90% crotonaldehyde by weight was liberated in the open air out of doors through a spray nozzle from a tank under $CO_2$ pressure. Titanium tetrachloride was simultaneously liberated through a nozzle from a separate tank under pressure at substantially the same point. The air immediately became saturated with the irritating vapors and it was difficult to approach closer than 75 feet to the dispersing apparatus. Persons who attempted to approach the apparatus were immediately completely decapacitated by virtue of excessive lachrymation and irritation of the membranes of the nose and throat. The effects lasted to a decapacitating extent from 15 to 30 minutes. The titanium tetrachloride produced a dense and persistent white smoke which accurately indicated the course and extent of distribution of the disabling gas. The air remained vitiated with the irritant gas for some time although a strong wind was rapidly blowing the vapors away.

I claim:

1. A disabling-gas-producing chemical comprising a solution of a normally solid, irritant-gas-producing halogenated acetophenone in crotonaldehyde.

2. A disabling-gas-producing chemical comprising a normally solid, irritant-gas-producing bromacetophenone in solution in crotonaldehyde.

3. A disabling-gas-producing chemical comprising a solution of chloracetophenone in crotonaldehyde.

4. A disabling-gas-producing chemical comprising a solution of up to 67% by weight of chloracetophenone in crotonaldehyde.

5. A disabling-gas-producing chemical comprising a solution of about 10% by weight of chloracetophenone in crotonaldehyde.

6. A disabling-gas-producing chemical comprising a normally solid, irritant-gas-producing chlorbromacetophenone dissolved in crotonaldehyde.

7. Method of producing a disabling gas which comprises liberating a solution of a normally solid, irritant-gas-producing halogenated acetophenone in crotonaldehyde.

8. Method of producing a disabling gas which comprises dissolving chloracetophenone in crotonaldehyde and volatilizing the resulting solution.

DUNCAN B. WILLIAMS.